(12) United States Patent
Hisamatsu

(10) Patent No.: US 6,377,707 B1
(45) Date of Patent: Apr. 23, 2002

(54) IMAGE PROCESSING SYSTEM

(75) Inventor: Yuji Hisamatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/295,541

(22) Filed: Apr. 21, 1999

(30) Foreign Application Priority Data

Apr. 30, 1998 (JP) .......................................... 10-120493

(51) Int. Cl.[7] ................................................ G06K 9/36

(52) U.S. Cl. ................ 382/233; 348/410.1; 375/240.24

(58) Field of Search ................................ 382/100, 232, 382/233–239, 246–248; 358/450, 453, 1.15, 1.18; 341/63–67; 345/530; 348/383, 384.1, 409.1, 410.1–423.1; 375/240, 240.01–240.29, 244; 386/52

(56) References Cited

U.S. PATENT DOCUMENTS

| 5,136,371 A | * | 8/1992 | Savatier et al. ........ 375/240.05 |
| 5,502,493 A | * | 3/1996 | Meyer .................... 375/240.26 |
| 5,727,113 A | * | 3/1998 | Shimoda ....................... 386/68 |
| 5,760,794 A | * | 6/1998 | Munson et al. .............. 345/522 |
| 5,761,698 A | * | 6/1998 | Combs ........................ 711/100 |

* cited by examiner

Primary Examiner—Jayanti K. Patel
(74) Attorney, Agent, or Firm—Scully, Scott, Murphy & Presser

(57) ABSTRACT

An image processing system is adapted to display pixel data for a specified small area on a screen. The system decodes compressed picture data represented in terms of coded differential data, and includes a plurality of decoding sections operating at a time in one clock for decoding the data of a pixel outside the specified area for high-speed decoding. In the specified area, the decoding sections operate in number corresponding to an enlargement/reduction ratio for the image in the specified area.

8 Claims, 8 Drawing Sheets

IMAGE PROCESSING SYSTEM

BACKGROUND OF THE INVENTION (a) Field of the Invention

The present invention relates to an image processing system and, more particularly, to an image processing system suitable for decoding compressed coded data of still pictures in, for example, digital television tuners, video telephone sets, and personal computers.

(b) Description of the Related Art

Some conventional image processing systems utilize a two-dimensional prediction scheme for prediction coding of still pictures. In this scheme, the value of one pixel on a scanning line is predicted on the basis of the value of the several pixels immediately preceding the one pixel. In this process, a predicted error signal (or differential value) is quantized, and instead of the quantized value of the predicted error itself, a quantized number corresponding to the quantized value of the predicted error is transmitted after being subjected to variable-length coding. A scheme wherein a prediction coefficient used in the prediction is set to "1" is called two-dimensional DPCM (Differential Pulse Code Modulation).

In the two-dimensional DPCM scheme, when still picture data obtained by raster scanning is stored in a frame buffer in the format of compressed still picture data, the pixel data for the first pixel on each line is stored in the frame buffer as an uncoded true value. In contrast, the pixel data for each pixel subsequent to the first pixel on each scanning line is stored in the frame buffer as a coded differential data obtained by coding a difference between the true value of the pixel and that of the preceding pixel. This compression processing decreases the number of memory cells used for storing data per a unit image size.

When picture data compressed by the two-dimensional DPCM scheme are to be decoded, the true value of the first pixel on each scanning line is first read out from the frame buffer. The decoder circuit outputs the true value data as the pixel data for the subsequent pixels on the each scanning line based on the true value data for the preceding pixel and the pixel data in terms of coded differential data by calculating a sum of the true value for the preceding pixel and decoded differential data.

In the conventional image processing system, when compressed still picture data for a specified small area in a screen of a display unit are to be decoded and output for display in the display unit, data for the other area falling outside the small area are also read out from the frame buffer and decoded pixel by pixel from the first pixel on each scanning line that is located before the small area to the last pixel on the each scanning line. Therefore, if the number of pixels falling outside the small area is large, the timing of start for data processing must be sufficiently earlier than the timing of start for the display of data for the small area, necessitating a complicated sequence.

Further, in the decoding processing, simultaneously with the operation of temporarily storing decoded pixel data of the small area into a decoded data buffer, an enlargement/reduction processing is generally performed by use of a dedicated enlargement/reduction circuit provided separately from the decoding circuit. The provision of decoding circuit and the enlargement/reduction circuit as respective dedicated circuits result in an increase in the circuit scale. In this case, a data buffer having a large storage capacity is required in order to increase the speed of the decoding processing.

SUMMARY OF THE INVENTION

In view of the foregoing, an object of the present invention is to provide an image processing system which performs high-speed decoding of pixel data falling outside of an arbitrary small area in a screen, thereby increasing the overall speed of decoding processing and an enlargement/reduction processing in the small area.

Another object of the present invention is to provide an image processing system which is capable of obviating necessity for providing a dedicated buffer for the enlargement/reduction processing.

The present invention provides an image processing system for decoding a compressed picture data, comprising:

a decoding block including a plurality of decoding sections each calculating a first true value data for one pixel based on a coded differential data for the one pixel and a second true value data for another pixel preceding the one pixel, the plurality of decoding sections being coupled together in a cyclic order such that the second true value data being calculated by another of the decoding sections; and an address control block for detecting whether the one pixel has an address equal to an address of a start point of a specified area, to generate a display start point signal, the plurality of decoding sections calculating the first true value data for the respective one pixels at a time in a single clock cycle before generation of the display start point signal on a scanning line.

In accordance with the image processing system of the present invention, compressed picture data can be decoded for the pixels outside the specified area at a higher speed corresponding to the number of the decoding sections. Further, the number of operational decoding sections may be changed in accordance with an enlargement/reduction ratio of the image size, which obviates the necessity of provision of a dedicated buffer.

The above and other objects, features and advantages of the present invention will be more apparent from the following description, referring to the accompanying drawings.

DESCRIPTION OF THE PREFERRED EMBODIMENTS

Figure 1:
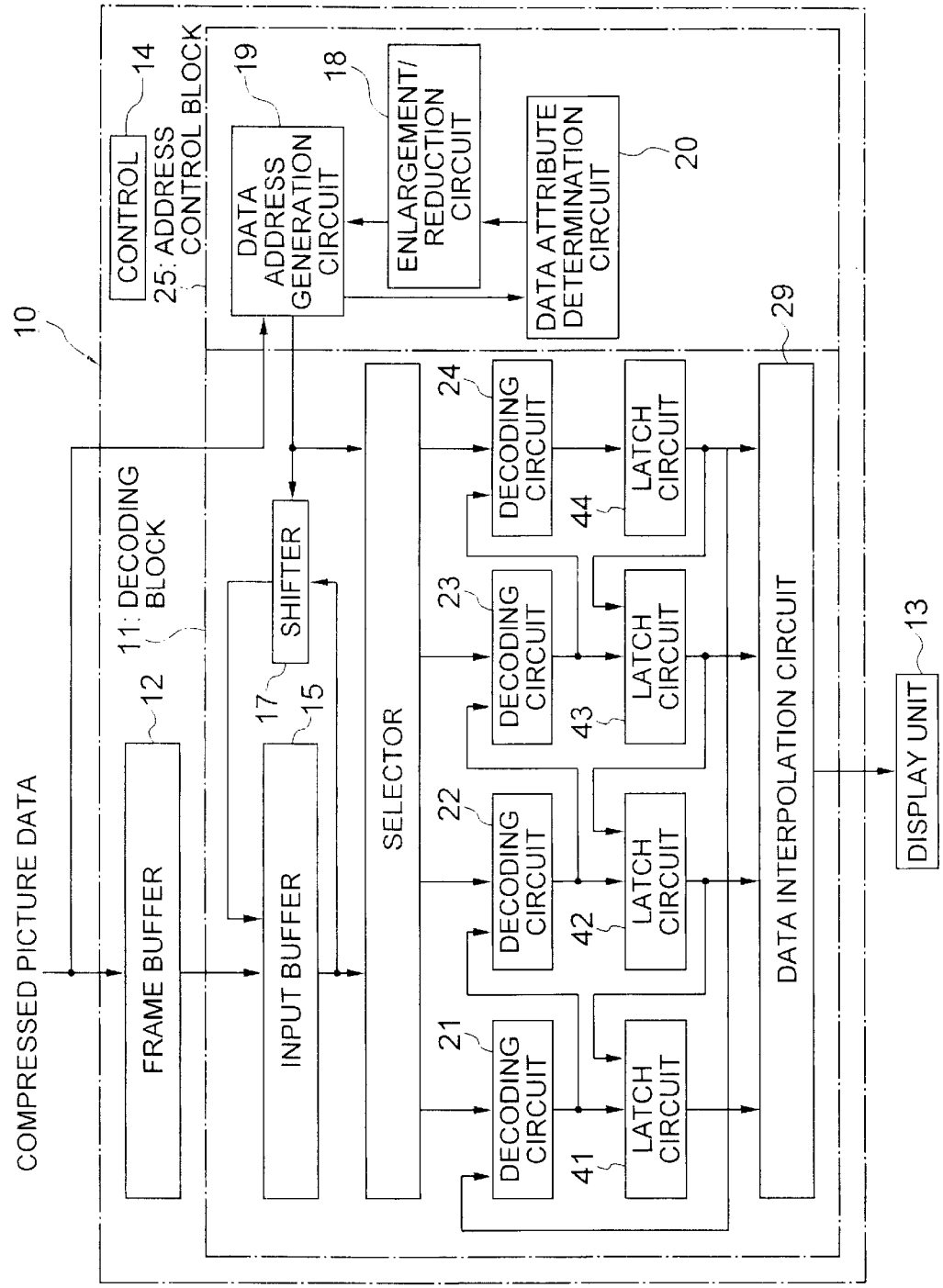
FIG. 1 is a block diagram of an image processing system according to a first embodiment of the present invention.

Embodiments of the present invention will now be described with reference to the accompanying drawings, wherein similar constituent elements are designated by similar reference numerals. Referring to FIG. 1, there is shown an image processing system according to a first embodiment of the present invention. The image processing system 10 includes a frame buffer 12 for storing compressed still picture data frame by frame, a decoding block 11 for decoding the compressed still picture data stored in the frame buffer 12, an address control block 25 for controlling the address for the decoding block 11, and a control unit 14 for controlling the frame buffer 12 and the decoding block 11.

The frame buffer 12 receives compressed still picture data in terms of coded differential value transmitted from outside the system together with index data attached therewith, which are then supplied to the data address generation circuit 19.

The decoding block 11 reads out the compressed still picture data from the frame buffer 12, performs decoding processing and enlargement/reduction processing of the compressed still picture data, and outputs the decoded image data as pixel data to a display unit 13. The decoding block 11 includes an input buffer 15 for temporarily storing the compressed still picture data read out from the frame buffer 12, a selector 16, a shifter 17, first through fifth decoding circuits 21 to 24 disposed in parallel, first through fourth latch circuits 41 to 44 disposed for respective decoding circuits 21 to 24 and each adapted to temporarily store (latch) a single decoded pixel data, and a data interpolation circuit 29 for calculating an interpolation or an average of the decoded pixel data such as an average with weighting.

The address control block includes a data address generation circuit 19 for generating address by incrementing the index data by a specified number, an enlargement/reduction circuit 18, and a data attribute determination circuit 20. The data attribute determination circuit 20 receives information for an interval at which two true value data appear in the compressed still picture data stored in the frame buffer 12, a display area start point at which the specified small area starts on the screen, a display area end point at which the specified small area ends on the screen and the addresses calculated by the data address generation circuit 19, and makes judgment as to whether or not the compressed still picture data temporarily stored in the input buffer 15 have addresses falling within the specified small area and whether each pixel value is expressed in the format of true value data or coded differential data.

The data address generation circuit 19 generates the address of the pixel data input to the decoding circuits 21 to 24 based on the index data attached to the compressed still picture data stored in the frame buffer 12. Specifically, the data address generation circuit 19 increments the address specified by the index data by a number corresponding to the number of the decoding circuits 21 to 24; i.e., four in this case, if the input pixel data fall outside the small area, and increments the address in accordance with a given enlargement/reduction ratio if the input pixel data fall within the small area, i.e., 1 in the case of equal size, 1/N in the case of reduction by N wherein N<1, and 1/N in the case of enlargement by N where N>1.

Figure 2:
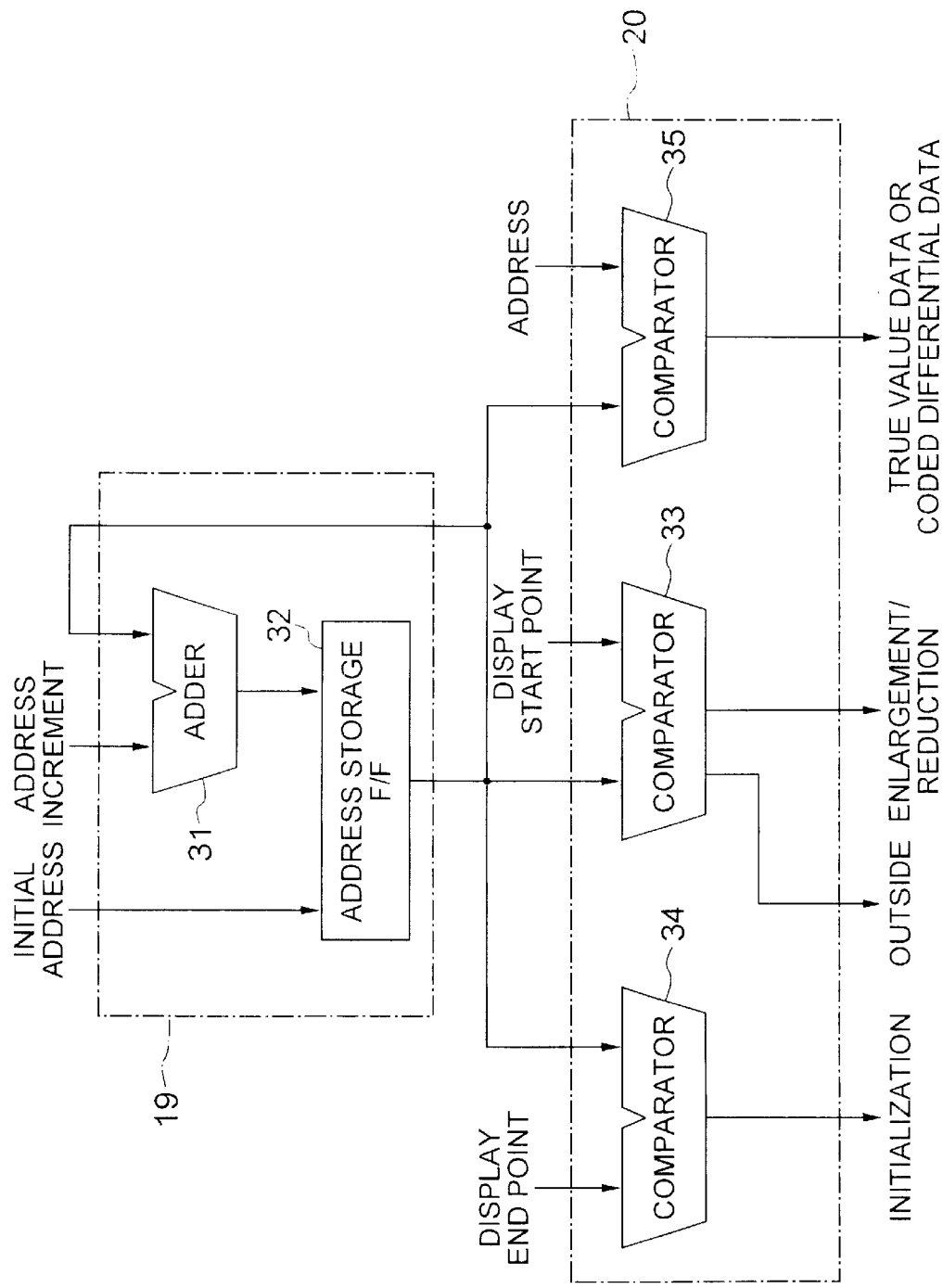
FIG. 2 is a block diagram schematically showing the functions of the data address generation circuit and the data attribute determination circuit shown in FIG. 1.

FIG. 2 schematically shows the functions of the data address generation circuit 19 and the data attribute determination circuit 20 shown in FIG. 1. The data address generation circuit 19 includes an adder 31 and an address storage F/F (flip-flop) 32, and the data attribute determination circuit 20 includes first through third comparators 33, 34, and 35.

The adder 31 adds the address increment as described above to the data fed-back from the address storage F/F 32 to thereby output a resultant sum to the address storage F/F 32. An initial address supplied as the address for a first pixel on a single line in the compressed still picture data is first input to the address storage F/F 32, and is output to the comparator 33 without modification. The initial address is subsequently input to the adder 31 after addition of the address increment thereto, and a sum resulting from the addition is output to the address storage F/F 32. The first comparator 33 compares the address output from the address storage F/F 32 against the display area start point. The second comparator 34 compares the address output from the address storage F/F 32 against the display area end point. The third comparator 35 compares the address output from the address storage F/F 32 against the address of the true value data in the compressed still picture data. Thus, the first comparator 33 judges as to whether or not the address output from the address storage F/F 32 falls outside the small area, and outputs an enlargement/reduction enable signal to the enlargement/reduction circuit 18 when the address of the current pixel data reaches the display area start point. The second comparator 34 judges as to whether or not the address output from the address storage F/F 32 exceeds the display area end point, and outputs an initialization enable signal when the address exceeds the display area end point. The third comparator 35 judges as to whether the pixel data concerned are true value data or coded differential data based on the address output from the address storage F/F.

The decoding circuits 21 to 24 have similar configurations and coupled to one another in a cyclic order as to the data flow. It is determined by the control unit 14 that the data which the data attribute determination circuit 20 have judged to be a true value data be input to the first decoding circuits 21. When the true value data is input to the decoding circuit 21, the decoding circuit 21 allows the input data to pass therethrough to the latch circuit 41 and to the subsequent decoding circuit 22. When coded differential data of a pixel is input to any of the decoding circuits 21 to 24, the decoding circuit decodes the same and obtains a true value data for the pixel based on the true value data for the preceding pixel and the coded differential data, and outputs the true value data therefrom. The number of pixel data decoded by the decoding circuits 21 to 24 is determined depending on the outputs of the data attribute determination circuit 20 and the display data address generation circuit 19. In another words, the number of decoding circuits operating at that time is determined by the data attribute determination circuit 20 and the data address generation circuit 19.

Figure 3:
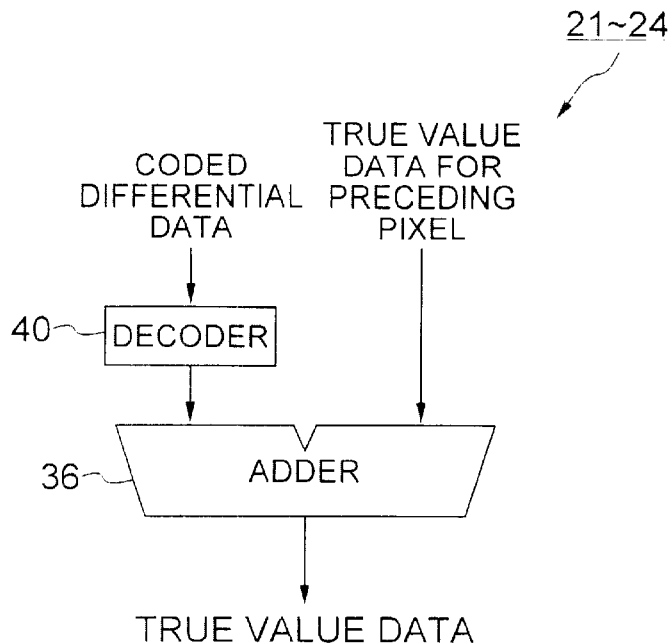
FIG. 3 is a block diagram of the decoding circuit shown in FIG. 1.

FIG. 3 schematically shows the configuration of each of the decoding circuits 21 to 24. Each of the decoding circuits 21 to 24 receives a coded differential data for a corresponding pixel from the input buffer 15 and the true value data for the preceding pixel. Each of the decoding circuits 21 to 24 includes a decoder 40 for decoding a coded differential data, and an adder 36 for adding the decoded differential data and the true value data for the preceding pixel so as to output the true value data.

Figure 4:
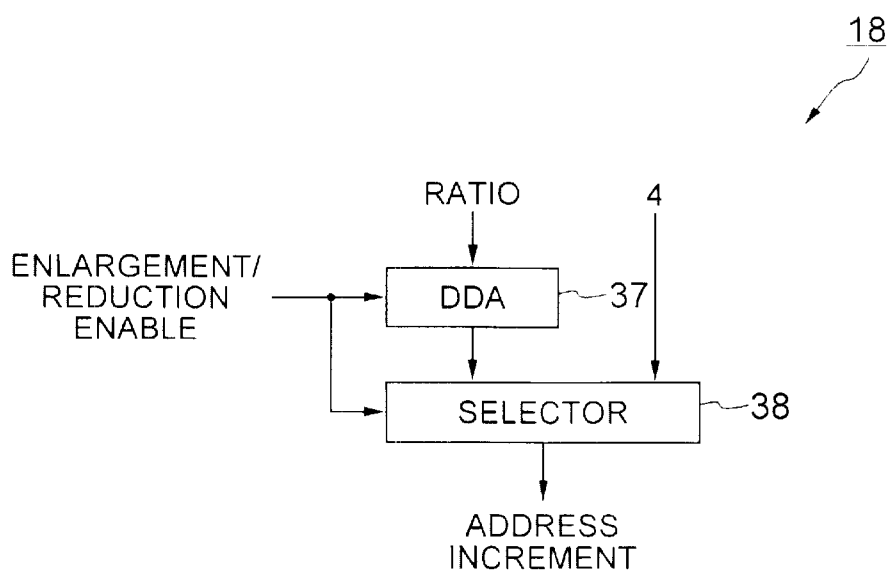
FIG. 4 is a block diagram of the enlargement/reduction circuit shown in FIG. 1.

FIG. 4 schematically shows the configuration of the enlargement/reduction circuit 18. Upon receipt of an enlargement/reduction enable signal from the data attribute determination circuit 20, the enlargement/reduction circuit 18 supplies the enlargement/reduction enable signal to a DDA (Digital Differential Analyzer) 37 and a selector 38. When the enlargement/reduction enable signal is input, the DDA 37 calculates a value for the address increment that falls between 0 and 4 on the basis of the designated enlargement/reduction ratio and outputs the thus-calculated address increment to the selector 38. When an enlargement/reduction enable signal is input, the selector 38 switches the address increment from four for a high-speed decoding of data for the pixels located before the display area start point to the value specified for an enlargement/reduction decoding of data for the pixels located between the display area start point and the display area end point.

Figure 5:
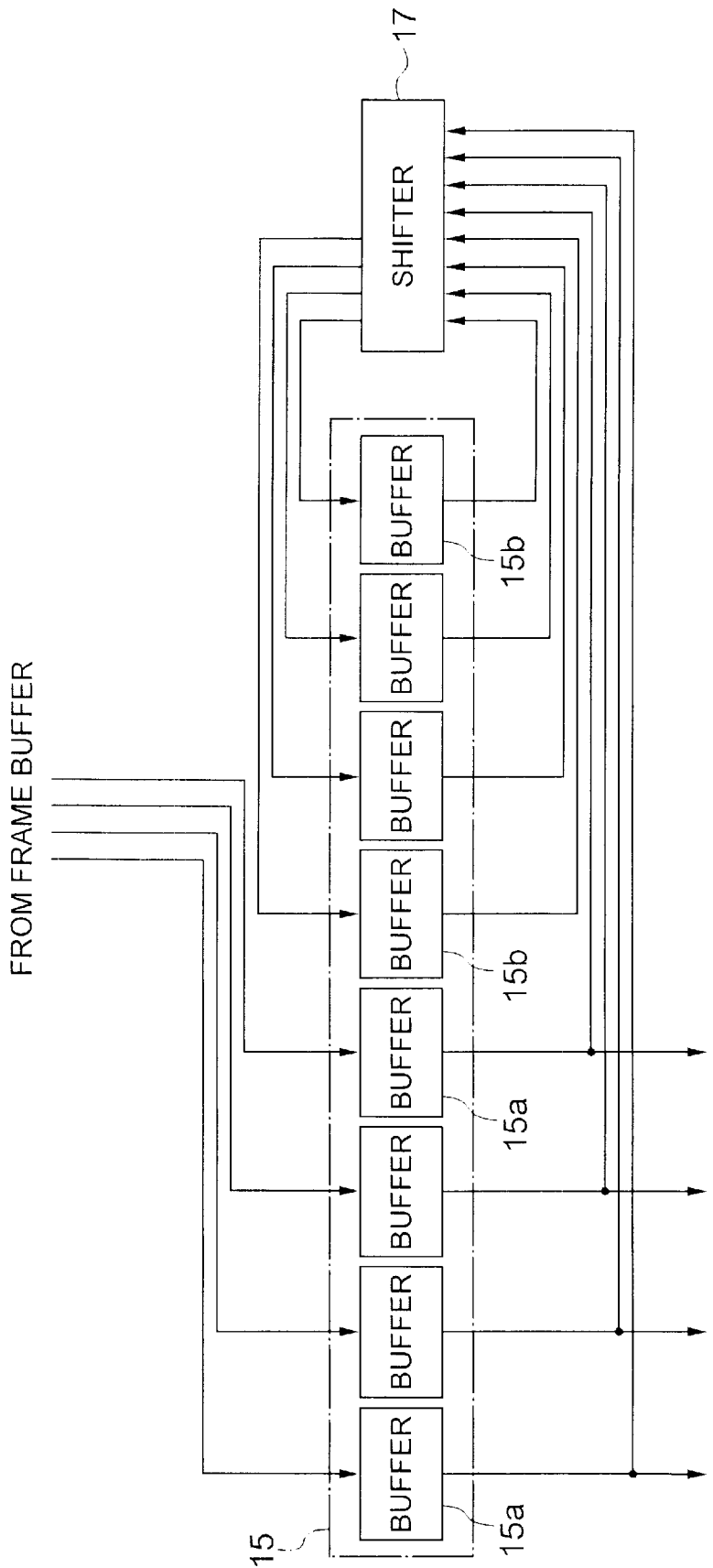
FIG. 5 is a block diagram of the input buffer and the shifter shown in FIG. 1.

FIG. 5 schematically shows the configurations of the input buffer 15 and the shifter 17. The input buffer 15 includes four first latches 15a disposed on the left side in the figure and four second latches 15b disposed on the right side, each of which latches a single pixel data. The four first latches 15a temporarily store four pixel data received from the frame buffer 12 in the case of high speed 15 decoding. The four pixel data are then shifted to the four second latches 15b via the shifter 17. After becoming empty due to the shift operation, the first latches 15a receive a next set of four pixel data. By iteration of these operations, sets of four pixel data are successively stored in the first latches 15a.

The data interoperation circuit 29 performs interpolation or averaging with weighting for four pixel data, for example, received from the four latch circuits 41 to 44 and outputs the calculated pixel data to the display unit 13.

In the present embodiment, each of the data address generation circuit 19 and the data attribute determination circuit 20 may be implemented by counters and comparators.

Figure 6:
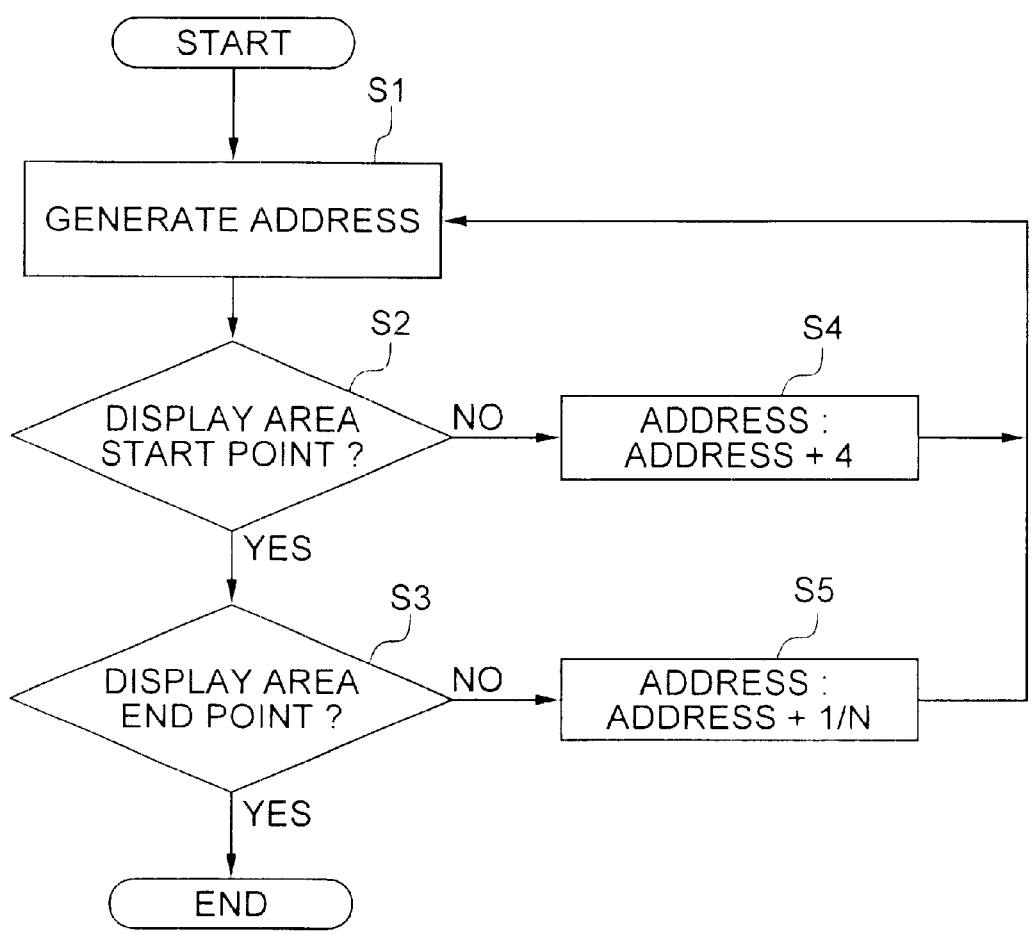
FIG. 6 is a flowchart showing the decoding processing and the enlargement/reduction processing performed by the image processing system shown in FIG. 1.

The operation of the image processing system according to the present embodiment will be now described with reference to FIGS. 1 to 6. The flowchart of FIG. 6 shows the decoding processing and the enlargement/reduction processing performed by the image processing system. In FIG. 6, symbol N represents an enlargement/reduction ratio. When 0<N<1, reduction processing is performed. When N=1, equal-size processing is performed. When N>1, enlargement processing is performed. If 0<N<1 and 1/N is not an integer, rounding-off processing is performed for approximation to obtain an integer for 1/N.

In response to an instruction input by an operator to display a picture image, supplied in the compressed still picture data as a image for a specified small area, on a screen, the control unit 14 first stores compressed still picture data in the frame buffer 12 in the format of coded differential data. The index data attached to the compressed still picture data are input to the data address generation circuit 19. Upon the start of processing, the control unit 14 initializes the address of the data address generation circuit 19 and also initializes the decoders 40 included in the decoding circuits 21 to 24.

Subsequently, under control of the control unit 14, the data attribute determination circuit 20 receives from the data address generation circuit 19 a display area start point, a display area end point, the address of the current pixel generated by the data address generation circuit 19, and an interval at which two true value data appear before the display area start point and closest to the display area start point in the compressed still picture data stored in the frame buffer 12. Further, the data attribution determination circuit 20 makes judgment as to whether or not the compressed still picture data temporarily stored in the input buffer 15 fall within the small area and whether each pixel data is a true value data or a coded differential data.

Subsequently, the data address generation circuit 19 generates an address increment for the pixel data input to the decoding circuit 21 (step S1 in FIG. 6). In this case, if the input data corresponds to a pixel falling outside the small area, the data address generation circuit 19 increments the address by four each time in order to decode the pixel data at a high speed, the number of address increment corresponding to the number of decoding circuits 21 to 24 operating at a time; i.e., four in this case. On the other hand, if the input data corresponds to a pixel falling within the small area, the data address generation circuit 19 increments the address in accordance with an enlargement/reduction ratio output from the enlargement/reduction circuit 18.

In the above operations, if the input data fall outside the small area, the control unit 14 controls the input buffer 15 and the selector 16 to fetch and decode four pixel data at a time until the data attribute determination circuit 20 detects the display area start point in step S2. In this operation, a minor correction is performed if it is detected that some of the four pixels fall outside the small area and the other of the four pixels fall within the small area.

Figure 7:
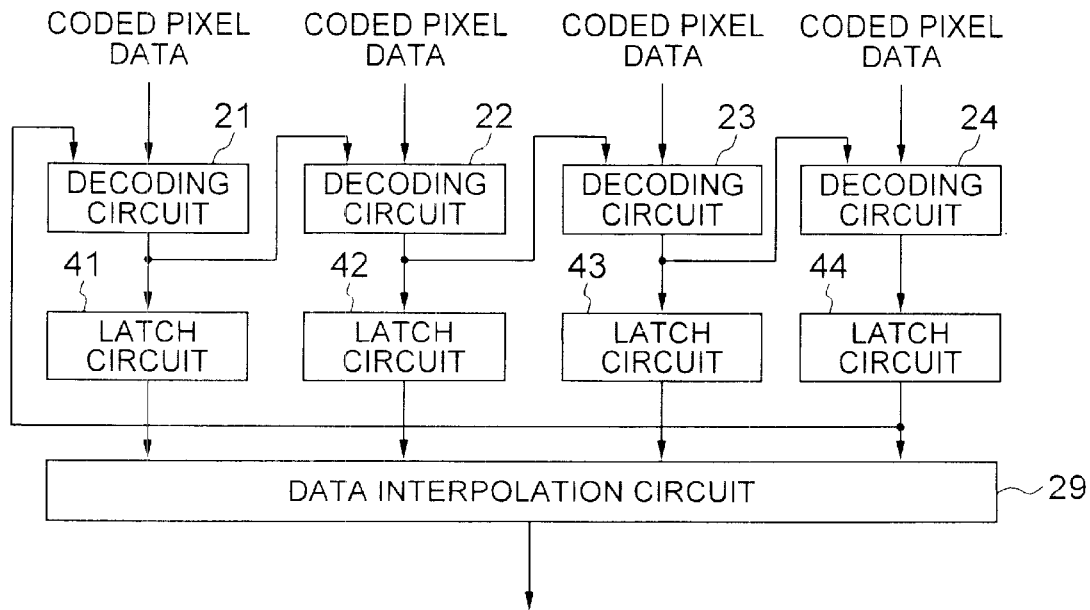
FIG. 7 is a functional block diagram of a main portion of the first embodiment showing the operation for decoding four pixel data at a time.

FIG. 7 is a functional block diagram for showing the operation of decoding circuits 21 to 24 in the case of the address increment being set to 4, typically for the pixels falling outside the small area. When a true value data set on the first pixel on a scanning line is received by the decoding circuit 21, the true value data is passed therethrough as it is to the corresponding latch circuit 41 and the next decoding circuit 22. The decoding circuit 22 thus receives the true value data for the first pixel from the decoding circuit 21 and a coded differential data for the second pixel on the scanning line to thereby output a true value data for the second pixel after calculating a sum thereof.

Further, the decoding circuit 23 outputs a true value data for the third pixel to the corresponding latch circuit 43 and the decoding circuit 24. Thus, the final stage decoding circuit 24 outputs a true value data for the fourth pixel to the latch circuit 44 after calculating a sum of the true value data for the third pixel and a decoded differential data for the fourth pixel. Thus, the data stored by the latch circuits 21 to 24 are updated to true value data for the first through fourth pixels. The stored data are not transferred to the display unit in this operation.

Since the true value data for the fourth pixel output from the fourth decoding circuit 24 is received by the first decoding circuit 21 as the true value data for the preceding pixel at a next operational stage or clock cycle due to the cyclic order coupling, the decoding circuit 21 outputs a true value data for the fifth (or subsequent) pixel after calculating a sum of the true value data for the fourth pixel and a decoded differential data for the fifth pixel. Similarly to the case of first through fourth pixels, true value data for the fifth to eighth pixels disposed before the small area are output to the latch circuits for update of the stored data. Similar operations are continued for the subsequent sets of four pixels until any of the pixels concerned falls within the small area. The updated data are not supplied to the display unit in these operations.

Subsequently, when the date attribution determination circuit 20 detects that the any of the data addresses has exceeded the display area start point, the enlargement/reduction circuit 18 outputs an enlargement/reduction enable signal and an enlargement/reduction ratio (step S2 in FIG. 6). After the latch circuits 41 to 44 have latched the respective true value data, the latch circuits 41 to 44 output the latched data in sequence corresponding to the address increment, which corresponds to the enlargement/reduction ratio, to thereby perform enlargement/reduction processing for the pixel data falling within the small area (step S5). The outputs of the decoding circuits 21 to 24 in this operational stage are iteratively supplied to the display unit as detailed later.

Subsequently, when the data attribution determination circuit 20 detects that all the data addresses have exceeded the display area end point (step S3 in FIG. 6), the control unit 14 returns to the initial step in FIG. 6 and starts for decode processing for the next line in the compressed still picture data.

When the decode processing has been completed for the compressed still picture data temporarily stored in the input buffer 15, new compressed still picture data are read out from the frame buffer 12 and are temporarily stored in the input buffer 15.

As described above, in the present embodiment, decoding processing for a set of four pixel data in a single clock cycle of the clock signal for the display unit can be iteratively performed until the date attribution determination circuit 20 detects the display area start point. That is, until the data address is judged as having reached the display area start point, the pixel data, in number equal to the number of the decoding circuits 21 to 24, are decoded at a high speed through parallel operation of all the decoding circuits without display on the display unit. By these operations, the speed of the decoding processing can be increased compared to the conventional image processing system in which decoding is performed pixel by pixel from the first pixel on a scanning line to the display area start point.

Figure 8:
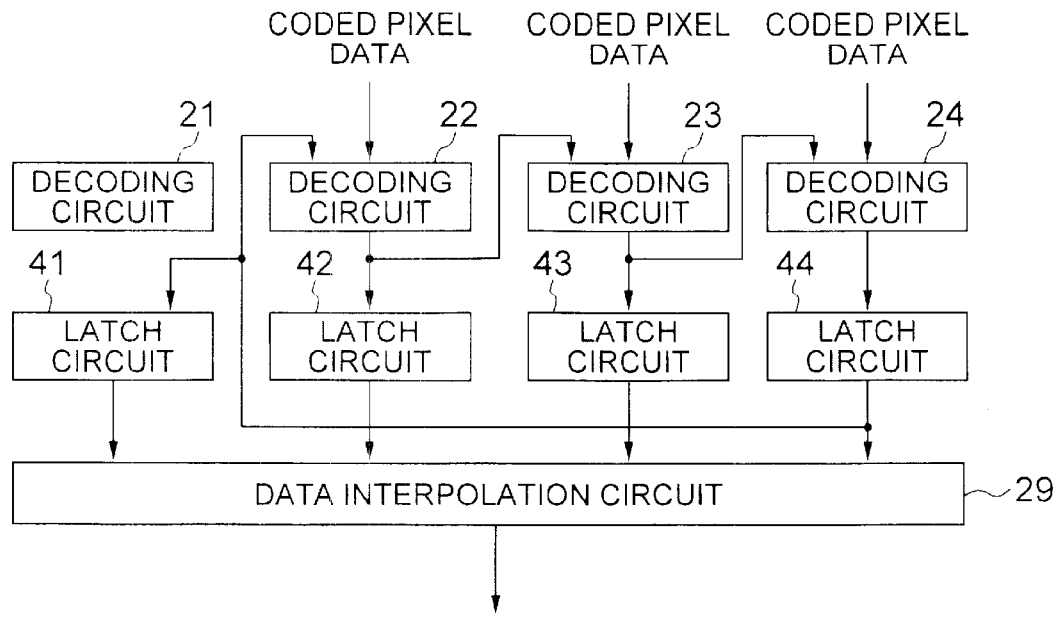
FIG. 8 is a functional block diagram of the main portion of the first embodiment showing the operation for decoding three pixel data at a time.

Next will be described the processing for decoding pixel data in the specified area in accordance with the enlargement/reduction ratio output from the enlargement/reduction circuit 18. Referring to FIG. 8, there is shown a reduction operation in which three pixel data are decoded at a time for a reduction display by ⅓. In the reducing processing, the contents of the latch circuit 21 are updated by the true value data stored in the latch circuit 44, and the contents of the latch circuits 42 to 44 are updated by the outputs of the decoding circuits 22 to 24, respectively.

Specifically, when the true value data for a first pixel located in the small area is received by the decoding circuit 22, the true value data is passed therethrough to the latch circuit 42 as it is. Thus, the decoding circuit 23 outputs the true value data for a second pixel to the corresponding latch circuit 43 based on the true value data for the first pixel and the coded differential data for the second pixel supplied to the decoding circuit 23. Further, the decoding circuit 24 outputs the true value data for a third pixel to the latch circuit 43 based on the true value data for the second pixel and the coded differential data for the third pixel supplied to the decoding circuit 24.

Since the true value data for the third pixel output to the latch circuit 44 serves as an input of the decoding circuit 22 at a next operational stage or clock cycle, the decoding circuit 22 outputs the true value data for a fourth pixel to the latch circuit 42 on the basis of the true value data for the third pixel and the coded differential data for the fourth pixel supplied to the decoding circuit 22. The true value data latched in the respective latches 42 to 44 are supplied to the data interoperation circuit 29, which performs averaging with weighting thereto for display of the resultant data on a single pixel of the display unit 13. These operations are completed in a single clock cycle of the clock signal for the display unit.

Figure 9:
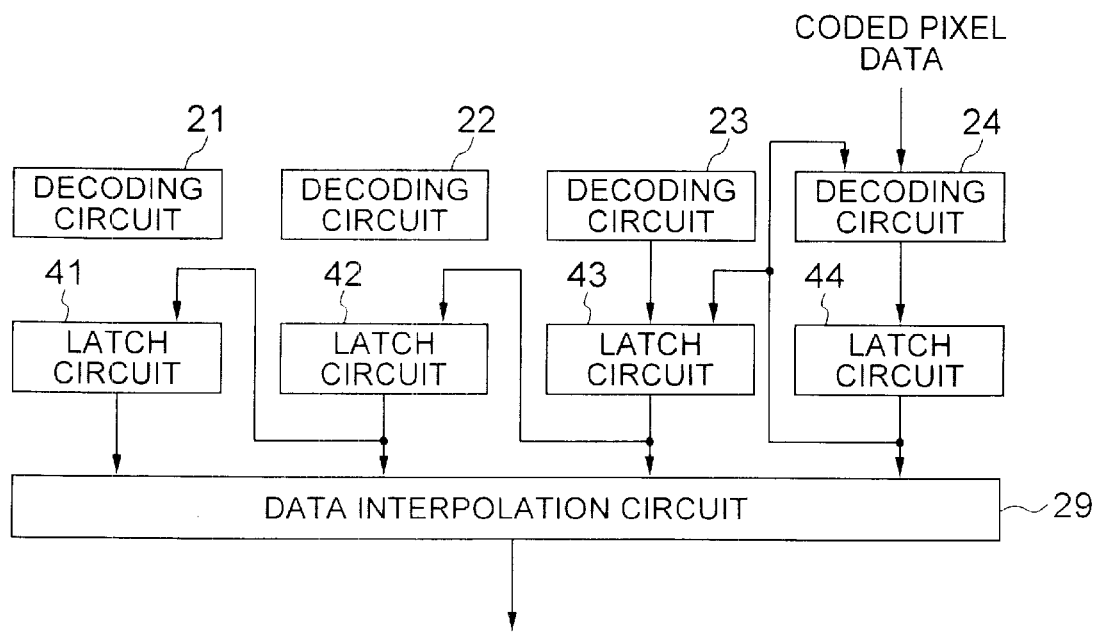
FIG. 9 is a functional block diagram of the main portion of the first embodiment showing the operation for decoding a single pixel data at a time.

Referring to FIG. 9, there is shown a equal-size decoding operation by the decoding circuits 21 to 24, wherein decoding circuits 21 to 23 are not used for decoding. The content of the latch circuit 44 is updated based on the true value data supplied from the decoding circuit 24, and each of the latch circuits 41 to 43 is updated on the basis of the data stored in the adjacent latch circuit succeeding thereto.

Specifically, when the true value data obtained by the previous operation for the first pixel in the small area is received by the decoding circuit 24, the true value data is passed therethrough to the latch circuit 44 as it is. At this stage, the data of the preceding latch circuits 41 to 43 are updated by the outputs of the succeeding adjacent latch circuits 42 to 44. Then, coded data for the second pixel in the small area is supplied to the decoding circuit 24, which outputs a true value data for the second pixel. The data in the latch circuit 44 is updated by the true value data for the second pixel. At this stage, the data in the latch circuits 41 to 43 are respectively updated by the data in the succeeding latch circuits 42 to 44. After the true value data for the first pixel reaches the latch circuit 41, other latch circuits 42 to 44 store data for the second through fourth pixels, respectively. These pixel data are supplied to the display unit as respective pixel data. These operation is executed in a single clock cycle of the display unit. Thus, the data for the first through the fourth pixels are displayed in the small area at an equal-size.

Figure 10:
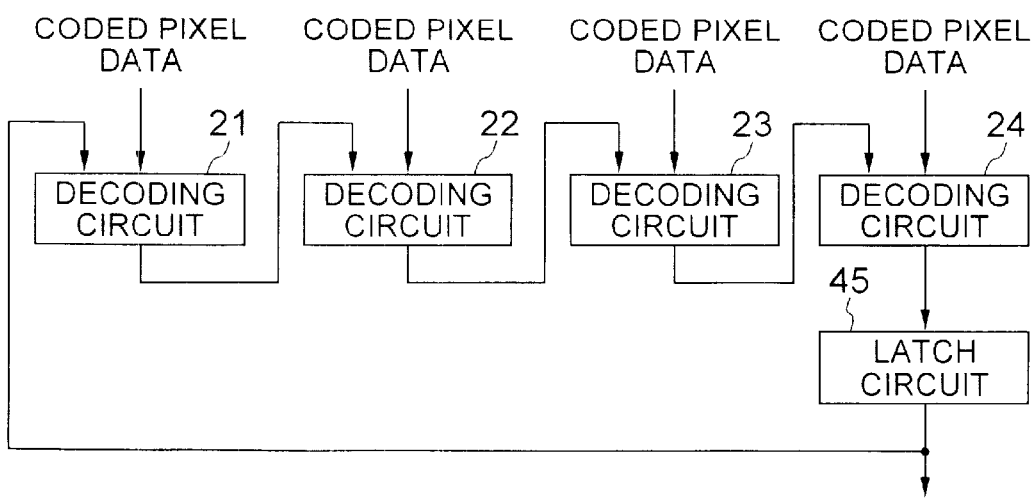
FIG. 10 is a functional block diagram of a main portion of an image processing system according to a second embodiment of the present invention showing the operation for decoding four pixel data at a time.
Figure 11:
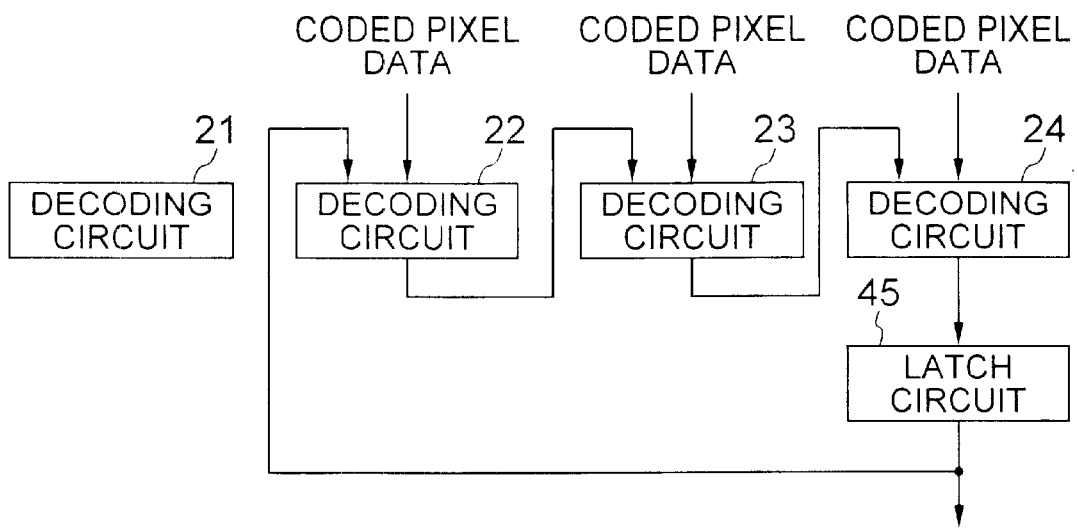
FIG. 11 is a block diagram of the main portion of the image processing system according to the second embodiment showing the operation for decoding three pixel data at a time.
Figure 12:
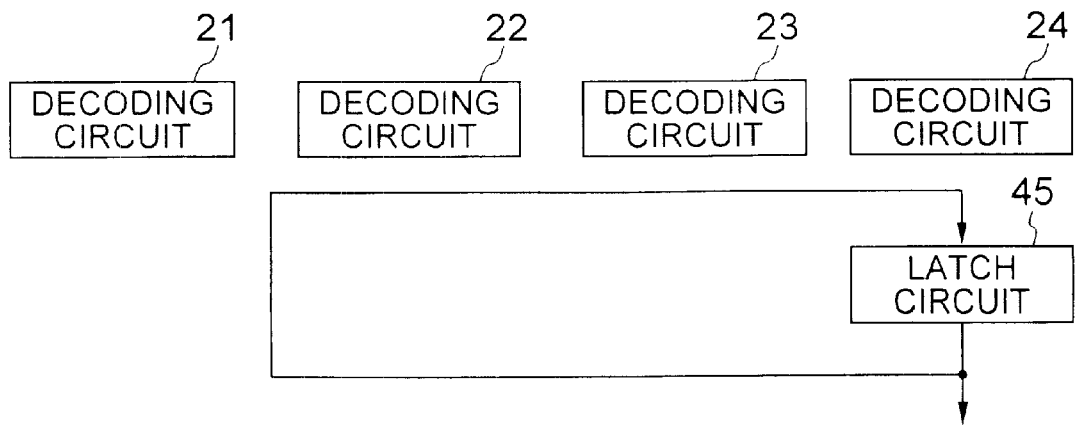
FIG. 12 is a block diagram of the main portion of the image processing system according to the second embodiment showing the operation for decoding with enlargement.

FIGS. 10 to 12 show functional diagrams of a main portion of an image processing system according to a second embodiment, which has a single latch circuit 45 provided for four decoding circuits 21 to 24: FIG. 10 shows signal flows in decoding four pixel data at the location before the display area start point; FIG. 11 shows signal flows in reduction decoding by use of three coded differential data after arrival at the display area start point; and FIG. 12 shows signal flows in a part of enlargement decoding after arrival at the display area start point. In the present embodiment, true value data for each pixel is output from the decoding circuit 24, and interoperation processing as in the first embodiment is not performed.

In FIG. 10, the decoding circuits 21 to 24 fetch respective true value data and coded differential data at a time from the input buffer 15 and the selector 16 such as shown in FIG. 1, then pass and decode the respective data until the data attribute determination circuit 20 detects the display area start point. When true value data for the first pixel on a scanning line before the small area is received by the decoding circuit 21, the true value data is passed therethrough to the decoding circuit 22 as it is. Then, the decoding circuit 22 outputs the true value data for the second pixel based on the output of the decoding circuit 21 and the coded differential data for the second pixel. Similarly, the decoding circuit 23 outputs the true value data for the third pixel based on the output of the decoding circuit 22 and the coded differential data for the third pixel. Thus, at the final stage the decoding circuit 24 outputs the true value data for the fourth pixel to the latch circuit 45 based on the output of the decoding circuit 23 and the coded differential data for the fourth pixel. The output of the latch circuit 45 is output to the decoding circuit 21 at the first stage.

Subsequently, the decoding circuit 21 outputs the true value data for the fifth pixel based on the output of the latch circuit 45 and the coded differential data for the fifth pixel. Similar operations are performed in the succeeding decoding circuits 22 to 24. These operations are performed until the data address reaches the display area start point. At this stage, no pixel data are supplied to the display unit. After the data attribute detection circuits detects the display area start point, the true value data for the first pixel is output through the latch circuit 45.

When the display area start point is detected, and thus an enlargement/reduction enable signal specifying a reduction ratio of 1/3 is output from the enlargement/reduction circuit 18, as shown in FIG. 11, decoding processing by use of three pixel data is performed. The operation shown in FIG. 11 is substantially the same as the operation shown in FIG. 8 except that the single latch circuit 45 outputs the pixel data.

In FIG. 12, it is shown that the true value data stored in the latch circuit 45 is iteratively output therefrom, for displaying the same true value data for the subsequent pixel, for displaying the same data for a number of pixels for enlargement. This process is intervened by an ordinal process wherein a data for a single pixel is output to the display unit for each clock cycle thereof.

As described above, in the image processing systems according to the first and second embodiments, the operation of decoding a maximum number of pixel data within a single clock cycle for the display unit is performed until the address reaches the display area start point. This is achieved by the configuration that the image processing system outputs image data for pixels in the specified area without outputting image data for pixels outside the specified area. Thus, decoding processing for the pixels outside the specified area can be performed at a high speed compared to the case of conventional techniques. This feature is very effective if the number of pixels falling outside the specified area is large, and enlargement display is requested in the specified area. Accordingly, the overall speed of decoding processing and encoding/reduction processing can be increased, and no dedicated buffer is required for the encoding/reduction processing.

Within the specified small area, the number of data to be decoded can be determined by the increment of the data address. Therefore, image deterioration occurring due to decoding errors can be mitigated. The reduction of image data read out for the pixels outside the small area is important when the frame buffer is implemented by a portion of a system memory.

Although the present invention has been described with reference to preferred embodiments thereof, the image processing system of the present invention is not limited thereto, and image processing systems obtained through various changes and modifications of the embodiments are also included within the scope of the present invention.

What is claimed is:

1. An image processing system for decoding a compressed picture data, comprising:

a decoding block including a plurality of decoding sections each calculating a first true value data for one pixel based on a coded differential data for said one pixel and a second true value data for another pixel preceding said one pixel, said plurality of decoding sections being coupled together in a cyclic order such that said second true value data being calculated by another of said decoding sections; and an address control block for detecting whether said one pixel has an address equal to an address of a start point of a specified area, to generate a display start point signal, said plurality of decoding sections calculating said first true value data for respective said one pixels at a time in a single clock cycle before generation of said display start point signal on a scanning line.

2. The image processing system as defined in claim 1, wherein said address control block comprises a data attribute determination circuit for receiving information of addresses of said start point and an end point of said specified area, an interval of two of true value data in the compressed picture data, and the address of said one pixel, said data attribute determination circuit detecting whether or not said one pixel is within said specified area and whether said data for said one pixel is a true value data or a coded differential data.

3. The image processing system as defined in claim 1, wherein said address control block comprises an enlargement/reduction control circuit for calculating an address increment based on an enlargement or reduction ratio, said enlargement/reduction control circuit switching the address increment when the address of said one pixel is equal to the address of said display start point.

4. The image processing system as defined in claim 3, wherein said address control block comprises a data address generation circuit for calculating an address of said one pixel input to one of said decoding sections, said address control block incrementing the address of said one pixel by a number equal to a number of said decoding sections when said one pixel is outside said specified area, and incrementing the address of said one pixel by a number corresponding to a ratio of enlargement/reduction.

5. The image processing system as defined in claim 4, wherein said decoding block comprises a plurality of latch circuits each corresponding to one of said decoding sections, said latch sections outputting respective said first true value data after said data attribute determination circuit detects said display start point, and an interpolation circuit for interpolating said first true value data based on the enlargement/reduction ratio.

6. The image processing system as defined in claim 4, wherein said decoding block comprises a latch circuit for receiving said first true value data from one of said decoding sections to output said first true value data to succeeding one of said decoding sections or another of said decoding sections.

7. The image processing system as defined in claim 1, wherein each of said decoding sections calculates a sum of said second true value data and a decoded differential value for said first pixel.

8. The image processing system as defined in claim 1, wherein said image processing system outputs image data for said one pixels in said specified area without outputting image data for said one pixels outside said specified area.

* * * * *